United States Patent
Collinge et al.

(10) Patent No.: US 10,476,871 B2
(45) Date of Patent: *Nov. 12, 2019

(54) METHOD AND SYSTEM FOR ENHANCED VALIDATION OF CRYPTOGRAMS IN CLOUD-BASED SYSTEMS

(71) Applicant: MASTERCARD INTERNATIONAL INCORPORATED, Purchase, NY (US)

(72) Inventors: Mehdi Collinge, Mont-Sainte-Aldegonde (BE); Michael Christopher Ward, Taunton (GB); Sandra Jansen, London (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/226,831

(22) Filed: Dec. 20, 2018

(65) Prior Publication Data
US 2019/0124077 A1 Apr. 25, 2019

Related U.S. Application Data

(63) Continuation of application No. 15/782,339, filed on Oct. 12, 2017, now Pat. No. 10,187,384, which is a
(Continued)

(51) Int. Cl.
*H04L 29/06* (2006.01)
*G06Q 20/00* (2012.01)
(Continued)

(52) U.S. Cl.
CPC ......... *H04L 63/0853* (2013.01); *G06Q 20/00* (2013.01); *G06Q 20/20* (2013.01);
(Continued)

(58) Field of Classification Search
CPC ... G06Q 20/00; H04L 63/083; H04L 63/0853; H04L 63/0876; H04L 63/123; H04L 63/10; H04L 63/0414
(Continued)

(56) References Cited

U.S. PATENT DOCUMENTS 7,607,164 B2   10/2009   Vasishth et al.
2003/0014372 A1   1/2003   Wheeler et al.
(Continued)

FOREIGN PATENT DOCUMENTS

JP   2002152196 A   5/2002
JP   2005210271 A   8/2005
(Continued)

OTHER PUBLICATIONS

PCT/US2016/046993, "International Search Report and Written Opinion Received", 9 pages.
(Continued)

*Primary Examiner* — Syed A Zaidi
(74) *Attorney, Agent, or Firm* — Buchanan Ingersoll & Rooney PC

(57) ABSTRACT

A method for enhanced validation of cryptograms for varying account number lengths includes: storing one or more primary account numbers and a plurality of formatting templates, each template being associated with an account number length; receiving a selection indicating a specific primary account number; identifying a specific formatting template where the associated account number length corresponds to a length of the specific primary account number; receiving an unpredictable number from a point of sale device; generating a cryptogram based on at least the unpredictable number and one or more algorithms; generating a data string, wherein the data string includes at least the generated cryptogram, the specific primary account
(Continued)

number, and the unpredictable number, and wherein the data string is formatted based on the identified specific formatting template; and electronically transmitting the generated data string to the point of sale device.

20 Claims, 8 Drawing Sheets

Related U.S. Application Data continuation of application No. 14/985,664, filed on Dec. 31, 2015, now Pat. No. 9,825,946.

(60) Provisional application No. 62/210,659, filed on Aug. 27, 2015.

(51) Int. Cl.
    *G06Q 20/20*     (2012.01)
    *G06Q 20/32*     (2012.01)
    *G06Q 20/38*     (2012.01)

(52) U.S. Cl.
    CPC ........... *G06Q 20/32* (2013.01); *G06Q 20/382* (2013.01); *H04L 63/0414* (2013.01); *H04L 63/083* (2013.01); *H04L 63/0876* (2013.01); *H04L 63/123* (2013.01); *H04L 63/10* (2013.01)

(58) Field of Classification Search
    USPC ........................................................ 713/170
    See application file for complete search history.

(56) References Cited

U.S. PATENT DOCUMENTS

| | | | |
|---|---|---|---|
| 2004/0005051 A1 | 1/2004 | Wheeler et al. | |
| 2005/0240432 A1 | 10/2005 | Jensen | |
| 2006/0064380 A1* | 3/2006 | Zukerman | G06Q 20/10 705/44 |
| 2007/0050229 A1 | 3/2007 | Tatro et al. | |
| 2007/0052517 A1* | 3/2007 | Bishop | G06Q 20/10 340/5.2 |
| 2009/0125429 A1* | 5/2009 | Takayama | G06Q 20/04 705/35 |
| 2009/0138394 A1 | 5/2009 | Garrison et al. | |
| 2011/0195748 A1 | 8/2011 | Main et al. | |
| 2011/0213678 A1 | 9/2011 | Chorney | |
| 2012/0136780 A1 | 5/2012 | El-Awady et al. | |
| 2012/0317035 A1 | 12/2012 | Royyuru et al. | |
| 2014/0095877 A1 | 4/2014 | Takahashi et al. | |

FOREIGN PATENT DOCUMENTS

| | | |
|---|---|---|
| JP | 2006295724 A | 10/2006 |
| WO | 2010/030362 A1 | 3/2010 |

OTHER PUBLICATIONS

Extended European Search Report dated Mar. 20, 2019, by the European Patent Office in corresponding European Patent Application No. 16844871.0-1218. (8 pages).

* cited by examiner

METHOD AND SYSTEM FOR ENHANCED VALIDATION OF CRYPTOGRAMS IN CLOUD-BASED SYSTEMS

FIELD

The present disclosure relates to enhanced validation of cryptograms for in cloud-based systems, specifically the enhanced validation of cryptograms and inclusion in data strings of varied data based on length of account numbers and unpredictable numbers used therein.

BACKGROUND

During the conducting of a payment transaction involving a payment card, cryptograms are often generated that are used in authentication of the payment card and authorization of the transaction. In many instances, a cryptogram may be generated by the payment card itself (e.g., in payment cards with integrated circuit) or a computing device used to convey payment details, such as a smart phone or tablet computer. However, there are limits on the amount of data that may be conveyed from the payment card or computing device to a point of sale for inclusion in a transaction message for the payment transaction. As a result, payment cards and computing devices often use specific formatting for the transmitted data, which includes the at least the cryptogram and a transaction account number.

However, as the number and type of transaction accounts increases, many financial institutions and other entities are interested in using account numbers of varying lengths. In particularly, many entities are interested in expanding transaction account numbers beyond the additional sixteen digits, for improved routing, accommodation of a greater number of transaction accounts, etc. Current systems are configured to use up to the limit of data space available for conveying to a point of sale and inclusion in a transaction message. As such, traditional computing systems are not equipped for the use of transaction account numbers of varying lengths, due to necessitated changes to the remainder of data to be conveyed to the point of sale, particularly while ensuring the inclusion of proper cryptograms and additional data.

Thus, there is a need for a technical solution where a computing device can be properly configured to accommodate for transaction account numbers of varying lengths while still including cryptograms and other data necessary for the use in payment transaction and staying within data limits.

SUMMARY

The present disclosure provides a description of systems and methods for enhanced validation of cryptograms for varying account number lengths.

A method for enhanced validation of cryptograms for varying account number lengths includes: storing, in a memory of a computing device, one or more primary account numbers and a plurality of formatting templates, wherein each template is associated with at least an account number length; receiving, by an input device of the computing device, a selection indicating a specific primary account number of the one or more primary account numbers; executing, by a querying module of the computing device, a query on the memory to identify a specific formatting template of the plurality of formatting templates where the associated account number length corresponds to a length of the specific primary account number; receiving, by a receiving device of the computing device, at least an unpredictable number from a point of sale device; generating, by a generation module of the computing device, a cryptogram based on at least the unpredictable number and one or more algorithms; generating, by the generation module of the computing device, a data string, wherein the data string includes at least the generated cryptogram, the specific primary account number, and the unpredictable number, and wherein the data string is formatted based on the identified specific formatting template; and electronically transmitting, by a transmitting device of the computing device, the generated data string to the point of sale device.

A system for enhanced validation of cryptograms for varying account number lengths includes: a memory of a computing device configured to store one or more primary account numbers and a plurality of formatting templates, wherein each template is associated with at least an account number length; an input device of the computing device configured to receive a selection indicating a specific primary account number of the one or more primary account numbers; a querying module of the computing device configured to execute a query on the memory to identify a specific formatting template of the plurality of formatting templates where the associated account number length corresponds to a length of the specific primary account number; a receiving device of the computing device configured to receive at least an unpredictable number from a point of sale device; a generation module of the computing device configured to generate a cryptogram based on at least the unpredictable number and one or more algorithms, and a data string, wherein the data string includes at least the generated cryptogram, the specific primary account number, and the unpredictable number, and wherein the data string is formatted based on the identified specific formatting template; and a transmitting device of the computing device configured to electronically transmit the generated data string to the point of sale device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
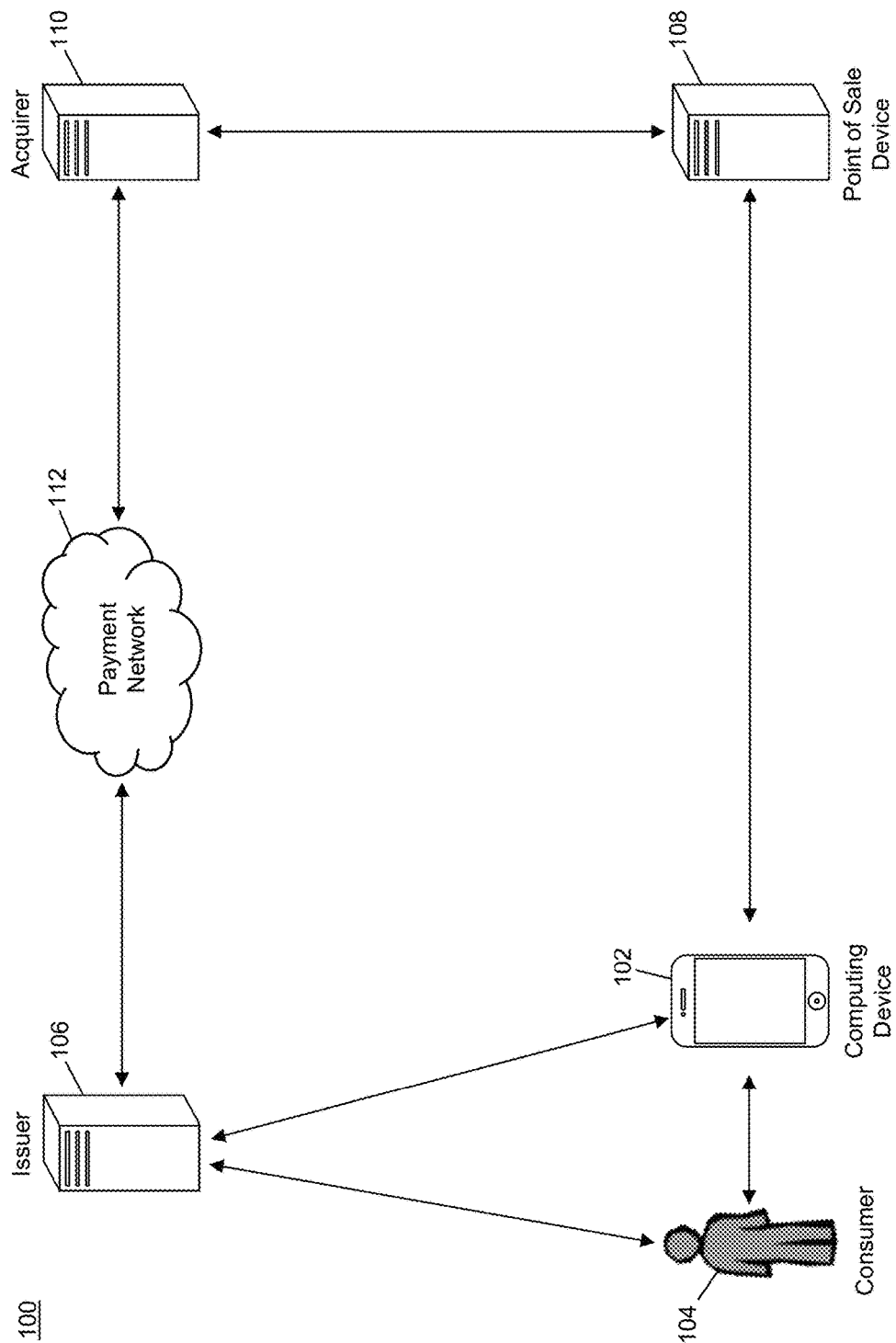
FIG. 1 is a block diagram illustrating a high level system architecture for enhanced validation of cryptograms for varying account number lengths in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

System for Enhanced Validation of Cryptograms

FIG. 1 illustrates a system 100 for the enhanced validation of cryptograms accounting for transaction account numbers of varying lengths.

The system 100 may include a computing device 102. The computing device 102, discussed in more detail below, may be configured to generate cryptograms for inclusion in a data string that accounts for transaction account numbers of varying lengths for inclusion in a transaction message used to process a payment transaction. The computing device 102 may be any suitable type of computing device, which may be a computing device specifically configured to perform the methods as discussed herein, such as a cellular phone, smart phone, laptop computer, tablet computer, desktop computer, smart watch, smart television, wearable computing device, implantable computing device, etc.

In the system 100, a consumer 104 may use the computing device 102 to convey payment details for use in a payment transaction. The consumer 104 may have a transaction account established with an issuer 106, which may be a financial institution, such as an issuing bank, or other entity configured to possess or otherwise manage transaction accounts for use by consumers 104 in funding payment transactions. The issuer 106 may issue the consumer 104 a transaction account, which may be used to fund payment transactions. The computing device 102 may be configured to store payment details associated with the transaction account, which may include at least a transaction account number and additional data associated therewith that may be used in the processing of payment transactions, such as a transaction counter, name, expiration date, security code, algorithm data, cryptogram data, etc. In some instances, the computing device 102 may be configured to store payment details for multiple transaction accounts, such as additional transaction accounts associated with the issuer 106 or one or more transaction accounts associated with one or more additional issuers 106.

The consumer 104 may, using the computing device 102, engage in a payment transaction with a merchant. As part of the engaging of the payment transaction, the consumer 104 may present the computing device 102 to a point of sale device 108 associated with the merchant for the conveyance of payment details to the point of sale device 108. As discussed in more detail below, the point of sale device 108 and computing device 102 may establish a communication channel and, using the communication channel, may exchange data for use in the processing of the payment transaction. The communication channel may use any suitable type of communication, such as cellular communication, radio frequency, near field communication, Bluetooth, etc.

The point of sale device 108 may generate an unpredictable number using methods that will be apparent to persons having skill in the relevant art, such as using a random or pseudo-random number generator, which may be electronically transmitted to the computing device 102 using the communication channel. In some instances, the unpredictable number may be of a varied length. For example, the unpredictable number may be two, three, four digits, or even more digits as may be applicable. In some embodiments, the length of the unpredictable number may be based on the length of the transaction account number used for funding of the payment transaction. In such an embodiment, the consumer 104 may first select a transaction account to use in the payment transaction via the computing device 102. The computing device 102 may, via the established communication channel, electronically transmit a length for the selected transaction account number or a desired unpredictable number length to the point of sale device 108. The point of sale device 108 may then generate and supply an unpredictable number of a suitable length accordingly, such as by using a random number generator configured to generate a random, unpredictable number of a specified length. In other embodiments, the point of sale device 108 may generate an unpredictable number of a length based on one or more internal rules, while the computing device 102 may adjust its processes accordingly to account for varying unpredictable number lengths.

The computing device 102 may receive the unpredictable number and may then generate one or more cryptograms for use in the payment transaction based thereon. Each cryptogram may be generated using one or more associated algorithms, which may be applied to at least the unpredictable number received from the point of sale device 108. In some instances, the algorithm(s) may also be applied to a transaction counter associated with the selected transaction account and an initialization vector. The initialization vector may be a diversification value input to the cryptogram calculation that does not depend on transaction data. In some cases, each cryptogram may be generated using a different algorithm or set of algorithms.

The computing device 102 may be configured to generate a data string. The data string may be formatted based on a specific formatting template. The specific formatting template may be one of a plurality of different formatting templates stored therein and configured for use in the formatting of data strings. The plurality of formatting templates may include formatting templates associated with each account number length for the transaction account numbers stored in the computing device 102. For example, the computing device 102 may store a formatting template for 16 digit account numbers, a formatting template for 17 digit account numbers, a formatting template for 18 digit account numbers, etc. In some instances, formatting templates may also be based on the unpredictable number length. For example, a formatting template may be associated with both an account number length (e.g., 16, 17, 18, 19, or 20 digits) and an unpredictable number length (e.g., 2, 3, or 4 digits).

In some embodiments, each formatting template may represent a data string of the same overall length, where the formatting template may specify the length and location of data included therein. For example, each formatting template may be used in the generation of a 28-digit data string or 28 digits of data located in a longer data string and may specify the length and location of the transaction account number and unpredictable number included therein, as well as the location of additional data to be included therein. Additional data that may be included in a data string may include the transaction counter associated with the transaction account used to fund the payment transaction, the cryptograms generated for the transaction, and extra digits suitable for use that may be dependent on additional criteria. For example, the extra digits may be used for cardholder verification method data, such as may be requested by the point of sale device 108 or specified by the computing device 102.

In some embodiments, each formatting template may be associated with one of Level 1, Level 2, or Level 3 data, as these terms would be known to someone skilled in the relevant art. In such instances, the formatting template may specify the length and location of the transaction account number, unpredictable number, and additional data in the context of the Level 1, Level 2, or Level 3 data. For example, the formatting template may specify the location of the data in a larger data string configured to store Level 1 data as set forth in standards associated with Level 1 data. In some instances, the formatting template may specify the entirety of the data string for the Level 1, Level 2, or Level 3 data, which may include the location and length of the transaction account number and unpredictable number.

In some instances, each formatting template may also be associated with a number and/or type of cryptogram. For example, a formatting template may specify that one, two, or three cryptograms are to be generated for inclusion in the corresponding data string, and may indicate algorithms for the generation thereof. In other instances, each formatting template may be associated with a number of cryptograms such that the computing device 102 may select a formatting template based on a number of cryptograms being generated, such as may be specifically requested by the point of sale device 108 or the issuer 106. For example, the issuer 106 may specify that, for a specific transaction account, two cryptograms must always be used. The computing device 102 may then select a formatting template accordingly that accommodates for two cryptograms and for the unpredictable number provided by the point of sale device 108.

The computing device 102 may generate the data string using the appropriate formatting template, and may electronically transmit the data string to the point of sale device 108 using the established communication channel. In some embodiments, the data string may be accompanied by a bitmap. The bitmap may be configured to indicate the formatting of the data string. The bitmap may be generated by the computing device 102 based on the formatting template, or may be stored therein and identified as accompanying the corresponding formatting template.

The point of sale device 108 may receive the data string, and, if applicable, the accompanying bitmap, from the computing device 102 using the communication channel. The point of sale device 108 may then electronically transmit the data string and additional transaction data related to the payment transaction to an acquirer 110 or other entity for processing via the payment rails. Additional transaction data may include, for example, a transaction amount, product data, offer data, point of sale device data, reward data, loyalty data, etc. The acquirer 110 may be a financial institution or other entity configured to possess or otherwise manage a transaction account associated with the merchant involved in the payment transaction for the receipt of funds from the consumer 104. The acquirer 110 may receive the transaction data and data string directly from the point of sale device 108 or via another entity (e.g., a gateway processor) via the payment rails associated with a payment network 112.

The acquirer 110 may generate a transaction message for the payment transaction, which may be submitted to the payment network 112 for processing. The transaction message may be a specially formatted data message that may be formatted pursuant to one or more standards governing the exchange of financial transaction messages, such as the International Organization of Standardization's ISO 8583 standard. The transaction message may include a plurality of data elements, which may be configured to store data as set forth in the associated standard(s). For instance, the transaction message may include a data element configured to store a transaction amount, a data element configured to store a transaction time, a data element configured to store a transaction date, etc. One or more data elements may also be configured to store the data string received from the computing device 102. In some instances, the data string may be stored in a data element configured to store Level 1, Level 2, or Level 3 data. In some cases, the data string may be included in a larger data string stored in a data element configured to store Level 1, Level 2, or Level 3 data.

The transaction message may also be configured to store a message type indicator, which may indicate a type of the transaction message. For example, the message type indicator may indicate the transaction message as being an authorization request, authorization response, etc. The acquirer 110 may electronically transmit the transaction message to the payment network 112 via the payment rails for processing. The payment network 112 may then process the payment transaction using traditional methods and systems based on the data included in the received transaction message, including the exchange of transaction information with the issuer 106. Additional data regarding transaction messages, the processing of payment transactions, and the exchange of transaction messages and transaction data via the payment rails is discussed below with respect to the process 700 illustrated in FIG. 7.

The methods and system discussed herein enable the processing of payment transactions via enhanced cryptogram generation and validation that can accommodate for transaction account numbers and unpredictable numbers of varying lengths. Via the use of special formatting templates by a specifically configured computing device, data strings may be generated that include cryptograms that are generated based on the length of the account number for the transaction account used to fund the payment transaction as well as the length of the unpredictable number used in the transaction.

Computing Device

Figure 2:
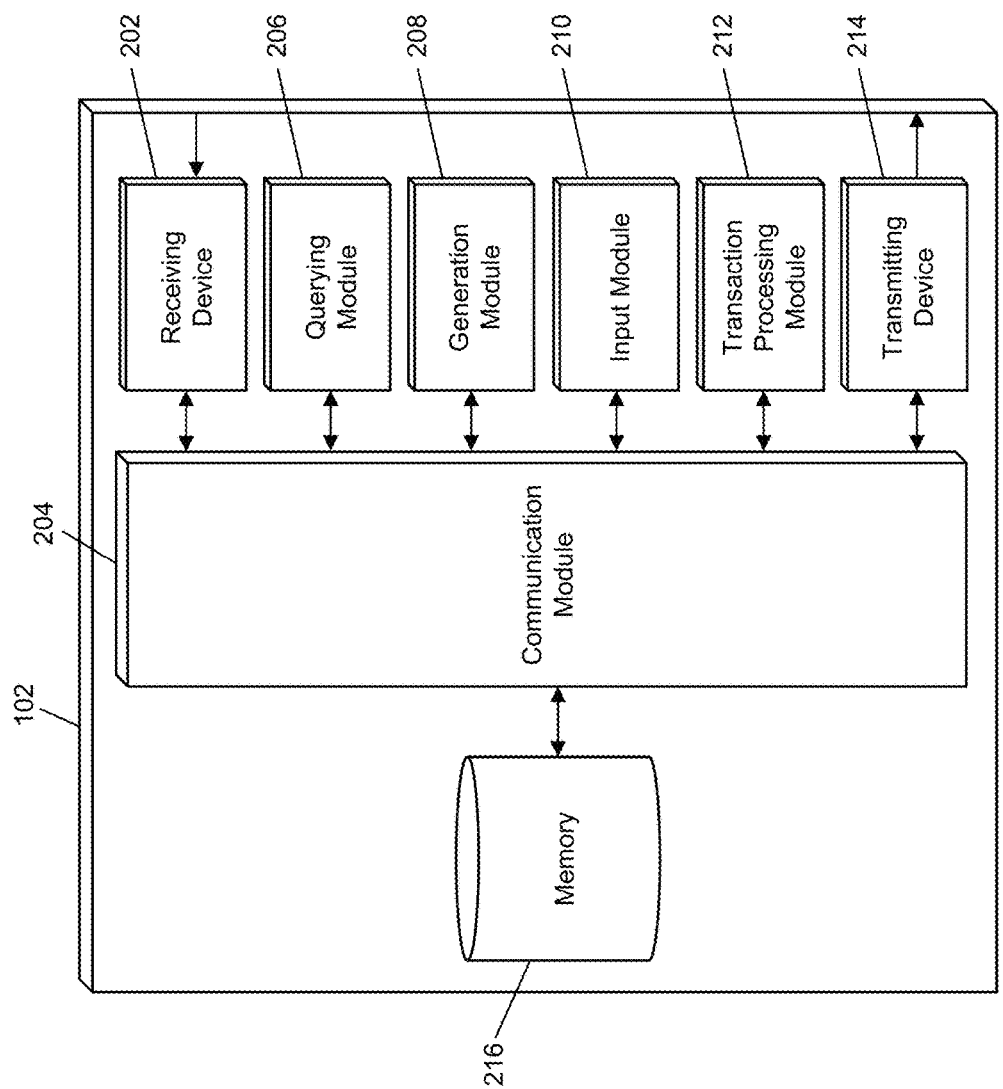
FIG. 2 is a block diagram illustrating the computing device of FIG. 1 for the generation and providing of a data string for enhanced cryptogram validation for account numbers of varying lengths in accordance with exemplary embodiments.

FIG. 2 illustrates an embodiment of the computing device 102 of the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 800 illustrated in FIG. 8 and discussed in more detail below may be a suitable configuration of the computing device 102.

The computing device 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from issuers 106, point of sale devices 108, payment networks 112, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuers 106, which may be superimposed with payment account details. For example, the issuer 106 may provision payment credentials for a transaction account to the computing device 102, which may be received by the receiving device 202 and include the corresponding transaction account number, transaction counter, and other data suitable for use in performing the functions discussed herein. The receiving device 202 may also be configured to receive data signals electronically transmitted by the point of sale device 108 during the conducting of payment transactions. Such data signals may be superimposed with unpredictable numbers, other transaction data, transaction confirmations, data requests, data specifications, etc. For example, the point of sale device 108 may specify a Level for the data requested from the computing device 102, and may also request a length for the unpredictable number.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 206, generation module 208, input module 210, transaction processing module 212, etc. As used herein, the term "module" may be software executed on hardware thereby resulting in a particularly programmed computer to receive an input, perform one or more processes using the input, and provide an output in a manner general purpose computers are not capable of performing. The input, output, and processes performed by various modules will be apparent to one skilled in the art based upon the present disclosure.

The computing device 102 may also include a memory 216. The memory 216 may be configured to store data for use by the computing device 102 in performing the functions discussed herein. The memory 216 may be configured to store data using suitable data formatting methods and schema and may be any suitable type of memory, such as read-only memory, random access memory, etc. The memory 216 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art upon reading the present disclosure.

The memory 216 may also be configured to store a plurality of formatting templates. Each formatting template may be associated with a length for transaction account numbers. In some instances, each formatting template may also be associated with an unpredictable number length. Formatting templates may also be associated with additional criteria, such as a Level for data (e.g., Level 1, 2, or 3), a number of cryptograms, extra digit specifications, etc. In some instances, formatting templates may also be associated with corresponding bitmaps stored in the memory 216. The memory 216 may also be configured to store payment transaction numbers and additional transaction account data suitable for use in the processing of payment transactions, such as a transaction counter, account name, zip code or postal code, expiration date, security number, etc. In some instances, data stored in the memory 216 may be stored in one or more relational databases that may utilize structured query language for the storage, identification, modifying, updating, accessing, etc. of structured data sets stored therein.

The computing device 102 may include a querying module 206. The querying module 206 may be configured to execute queries on databases to identify information. The querying module 206 may receive one or more data values or query strings, and may execute a query string based thereon on an indicated database, such as the memory 216, to identify information stored therein. The querying module 206 may then output the identified information to an appropriate engine or module of the computing device 102 as necessary. The querying module 206 may, for example, execute a query on the memory 216 to identify account data associated with a transaction account and a specific formatting template for use in generating a data string for use in processing a payment transaction. The identified account data, which may include at least a transaction account number and transaction counter, and the specific formatting template may be passed to a generation module 208.

The generation module 208 may be configured to generate cryptograms and data strings. The generation module 208 may receive and instruction and corresponding data, may generate data based thereon, and may output the generated data to one or more other modules or engines of the computing device 102 for use in performing the functions discussed herein. For example, the generation module 208 may receive account and/or transaction data, as well as one or more algorithms (e.g., identified in the memory 216 by the querying module 206) and generate one or more cryptograms accordingly. In some instances, each cryptogram may utilize separate algorithms in the generation thereof, but may utilize the same data in the generation thereof. The generation module 208 may also use the account and transaction data and a specific formatting template and generate a data string formatted based on the specific formatting template, and may include the transaction account number, unpredictable number, cryptograms, and other data at lengths and locations accordingly. Generated data strings may be output to the transaction processing module 212 and/or transmitting device 214. In some embodiments, the generation module 208 may also be configured to generate a bitmap corresponding to a specific formatting template, which may be included in a corresponding generated data string.

In some embodiments, the computing device 102 may include an input module 210. The input module 210 may be configured to receive input from a user of the computing device 102, such as the consumer 104. The input module 210 may be interfaced with one or more input devices for the receipt of data signals therefrom, such as a keyboard, mouse, touch screen, scroll wheel, click wheel, microphone, camera, etc. The input module 210 may receive input from the consumer 104 and may pass the data to a corresponding module or engine of the computing device 102. For example, the input module 210 may receive an instruction from the consumer 104 for the conducting of a payment transaction, which may instruct the receiving device 202 to establish a communication channel with a point of sale device 108 to receive transaction data, as well as a selection indicating a transaction account to use to fund the payment transaction.

In some instances, the computing device 102 may include a transaction processing module 212. The transaction processing module 212 may be configured to perform additional functions of the computing device 102 suitable for use in the processing of payment transactions. For example, the transaction processing module 212 may be configured to increment a transaction counter for a transaction account each time a data signal is transmitted for use in a payment transaction, such as by submitting a query to the querying module 206 to update the transaction counter in the memory 216. In another example, the transaction processing module 212 may be configured to validate transaction data received by the receiving device 202 from the point of sale device 108, such as to ensure the point of sale device 108 is genuine using methods that will be apparent to persons having skill in the relevant art.

The transmitting device 214 may be configured to transmit data over one or more networks via one or more network protocols. In some embodiments, the transmitting device 214 may be configured to transmit data over the payment rails, such as using specially configured infrastructure associated with payment networks 112 for the transmission of transaction messages that include sensitive financial data and information, such as identified payment credentials. In some instances, the transmitting device 214 may be configured to transmit data to issuers 106, point of sale devices 108, acquirers 110, payment networks 112, and other entities via alternative networks, such as the Internet. In some embodiments, the transmitting device 214 may be comprised of multiple devices, such as different transmitting devices for transmitting data over different networks, such as a first transmitting device for transmitting data over the payment rails and a second transmitting device for transmitting data over the Internet. The transmitting device 214 may electronically transmit data signals that have data superimposed that may be parsed by a receiving computing device. In some instances, the transmitting device 214 may include one or more modules for superimposing, encoding, or otherwise formatting data into data signals suitable for transmission.

The transmitting device 214 may be configured to electronically transmit data signals to point of sale devices 108 that are superimposed with generated data strings using a communication channel established with the point of sale device 108. In some instances, the transmitting device 214 may also electrically transmit bitmaps to point of sale devices 108, which may correspond to the formatting of the data string transmitted thereto. The transmitting device 214 may also be configured to electronically transmit data messages to additional entities, such as to the issuer 106 requesting the provisioning of payment credentials.

Process for Enhanced Cryptogram Validation for Varying Account Lengths

Figure 3:
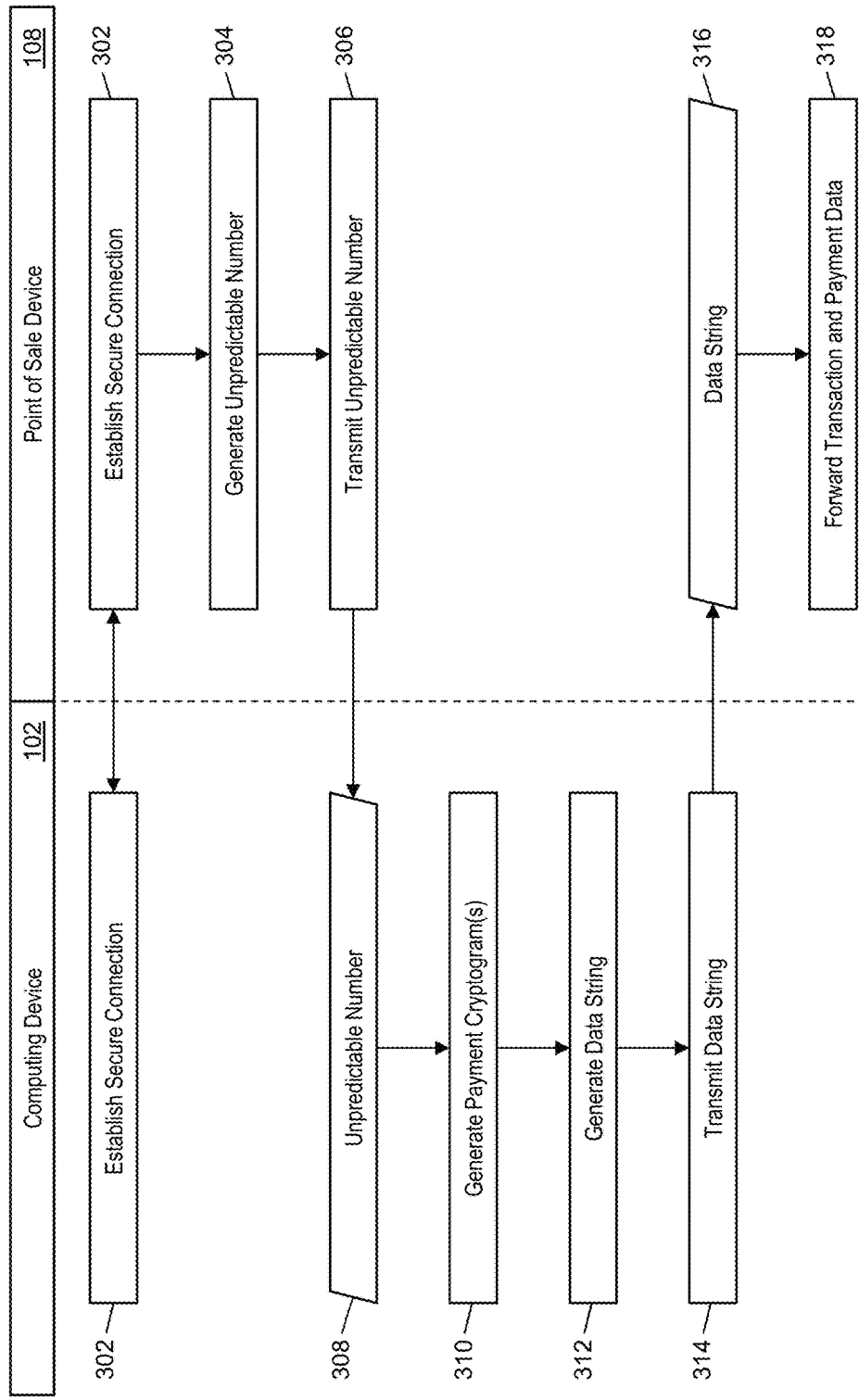
FIG. 3 is a flow diagram illustrating a process for enhanced generation and validation of cryptograms for varying account number lengths using the system of FIG. 1 in accordance with exemplary embodiments.

FIG. 3 illustrates a process for the use of enhanced cryptogram validation that accounts for transaction account numbers and unpredictable numbers of varying lengths using the system 100.

In step 302, the computing device 102 and point of sale device 108 may establish a communication channel. In some instances, the communication channel may be a secure connection, such that other devices and/or entities may be unable to access the data electronically transmitted between the devices using the connection. The communication channel may utilize any type of communication method and/or protocol suitable for performing the functions discussed herein, such as near field communication, radio frequency communication, cellular network communication, etc.

In step 304, the point of sale device 108 may generate an unpredictable number. In some embodiments, the length of the unpredictable number may be set by the point of sale device 108, but may also not be uniform with all other point of sale devices. The length may be static (e.g., the same in every transaction) or may vary. The variance of the length may be random, may be based on internal criteria of the point of sale device 108, or may be based on a requested unpredictable number length as provided by the computing device 102 to the point of sale device 108 via an electronic transmission using the communication channel.

In step 306, the point of sale device 108 may electronically transmit the unpredictable number to the computing device 102 using the communication channel. In step 308, the receiving device 202 of the computing device 102 may receive the unpredictable number. In step 310, one or more payment cryptograms may be generated by the generation module 208 of the computing device 102. Each cryptogram may be generated via the application of one or more algorithms (e.g., as queried from the memory 216 by the querying module 206) to at least the unpredictable number. Each algorithm may also be applied to the transaction counter associated with the transaction account being used to fund the payment transaction, and an initialization vector.

In some instances, the number and/or type of cryptograms may be based on a specific formatting template identified for the transaction. The specific formatting template may be based on at least the length of a transaction account number used in the funding of the payment transaction. The transaction account number may be identified as a default number to be used in transactions, or may be indicated in a selection made by the consumer 104 via the input module 210 of the computing device 102. In some instances, the number and/or type of cryptograms may be specified by the point of sale device 108, and may be indicated in a submission accompanying the unpredictable number, as transmitted to the computing device 102 in step 306 and received in step 308.

Once the cryptogram(s) have been generated, then, in step 312, the generation module 208 may generate a data string. The data string may be formatted based on the specific formatting template and may include the data indicated therein in the lengths and location as specified in the formatting template. For example, the formatting template may specify the length of the transaction account number and unpredictable number and the location of each in the data string, as well as the location of additional data that may be included therein, such as the transaction counter and one or more extra digits.

In step 314, the transmitting device 214 of the computing device 102 may electronically transmit the generated data string to the point of sale device 108 using the established communication channel. In some instances, the transmitting device 214 may also transmit a bitmap corresponding to the specific formatting template to the point of sale device 108. In step 316, the point of sale device 108 may receive the data string, and, in step 318, may electronically transmit transaction data and payment data, including the received data string, to an acquirer 110 or other entity for use in processing the payment transaction.

Process for Generating a Data String Formatted Based on Varying Account Lengths

Figure 4:
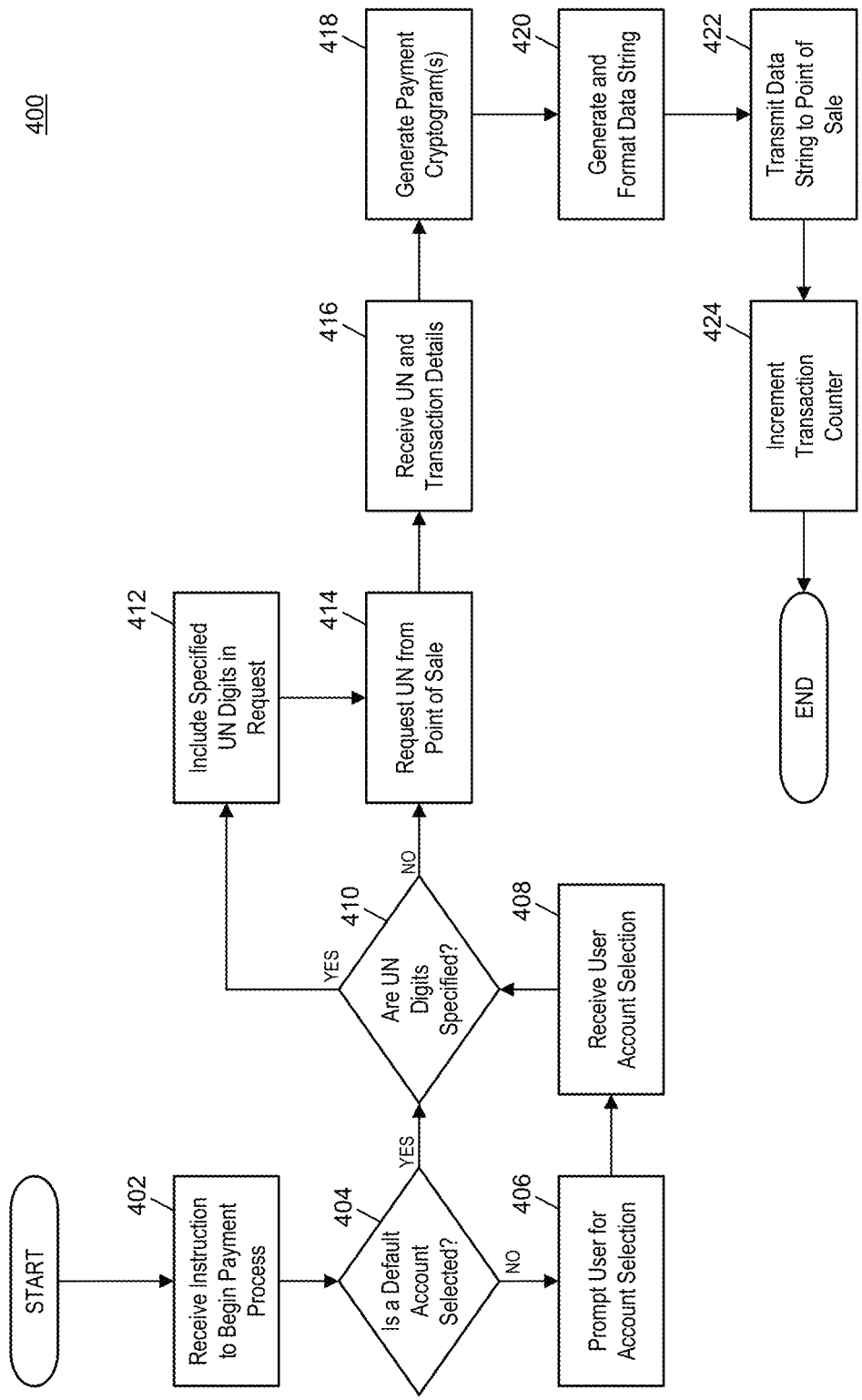
FIG. 4 is a flow diagram illustrating a process for generation and conveyance of a data string for enhanced validation of a cryptogram for account numbers of varying lengths using the computing device of FIG. 1 in accordance with exemplary embodiments.

FIG. 4 illustrates a process 400 for the generation and conveyance of a data string that includes a transaction account number and one or more cryptogram for enhanced validation that is formatted based on the length of the transaction account number and an unpredictable number, which may vary from one transaction to another.

In step 402, the computing device 102 may receive an instruction to begin the payment process for a payment transaction, which may be received via the input module 210. Receipt of the instruction may include the consumer 104 making one or more selections via the input module

210. In step 404, the computing device 102 may determine if a default payment account is established in the computing device 102, such as based on data stored in the memory 216 accompanying the account details for the stored transaction account(s). In some instances, a default transaction account may be indicated if the memory 216 stores account details for a single transaction account. In some cases, the determination may be based on the received instructions, such as if the consumer 104 indicates that the default transaction account is not to be used.

If a default transaction account is not selected or is not to be used, then, in step 406, the computing device 102 may prompt the consumer 104 to select one of the transaction accounts for which account data is stored in the memory 216 of the computing device. The prompt may be made using one or more audio or visual display devices, such as a display screen or speakers. In step 408, the input module 210 may receive the consumer's selection of a transaction account to be used in funding the payment transaction. In instances where the instruction received in step 402 may include an indicated transaction account (e.g., as determined in step 404), then steps 406 and 408 may be skipped.

Once a transaction account has been identified, then, in step 410, the computing device 102 may determine if the number of unpredictable number (UN) digits is specified. The length of the unpredictable number may be specified by a specific formatting template identified by the computing device 102 based on the length of the selected transaction account number. For example, the memory 216 may include a single formatting template for the length of the transaction account number, which may require a specific length for the unpredictable number, which may thus specify that number of digits for the unpredictable number. In another example, the memory 216 may include formatting templates for the specific transaction account number length to accommodate any unpredictable number length as may be provided by the point of sale device 108.

If the length of the unpredictable number is specified, then, in step 412, the generation module 208 may generate a data request that includes the specified number of digits in the unpredictable number. In step 414, the transmitting device 214 may electronically transmit a request for an unpredictable number to the point of sale device 108. In instances where a specific length is specified, the transmitted request may include the specified number of digits. If, in step 410, the length of the unpredictable number is not specified, step 412 may be skipped and the process 400 proceed to step 414, as described above. In step 416, the receiving device 202 may receive the unpredictable number and any additional transaction data from the point of sale device 108. Additional transaction data may include, for example, a transaction amount, cryptogram request, point of sale data, merchant data, etc.

In step 418, the generation module 208 may generate one or more cryptograms based on at least the unpredictable number. Each cryptogram may also be based on at least a transaction counter associated with the selected transaction account as well as an initialization vector. In some instances, each cryptogram may be generated using the same data, but may be generated via the application of a different algorithm or algorithms to the data. In some embodiments, the number of cryptograms and/or algorithms used in the generation thereof may be based on the transaction details received from the point of sale device 108 or the specific formatting template. In instances where the unpredictable number length was not specified, the specific formatting template may be one associated with the transaction account number length, and the length of the unpredictable number received from the point of sale device 108.

In step 420, the generation module 208 may generate and format a data string. The data string may be formatted based on the specific formatting template and may include data therein and in locations as specified by the specific formatting template. The data string may include, for example, the transaction account number, unpredictable number, transaction counter, and additional data as specified in the formatting template, such as additional Level 1, Level 2, or Level 3 data, cardholder verification method data, etc. In step 422, the transmitting device 214 may electronically transmit the data string to the point of sale device 108 using the established communication channel. In step 424, the transaction counter associated with the selected transaction account may be incremented to account for the transaction such that it may be accurate for use in generating cryptograms in future transactions.

Formatting of Data Strings for Varying Account and Unpredictable Number Lengths

Figure 5:
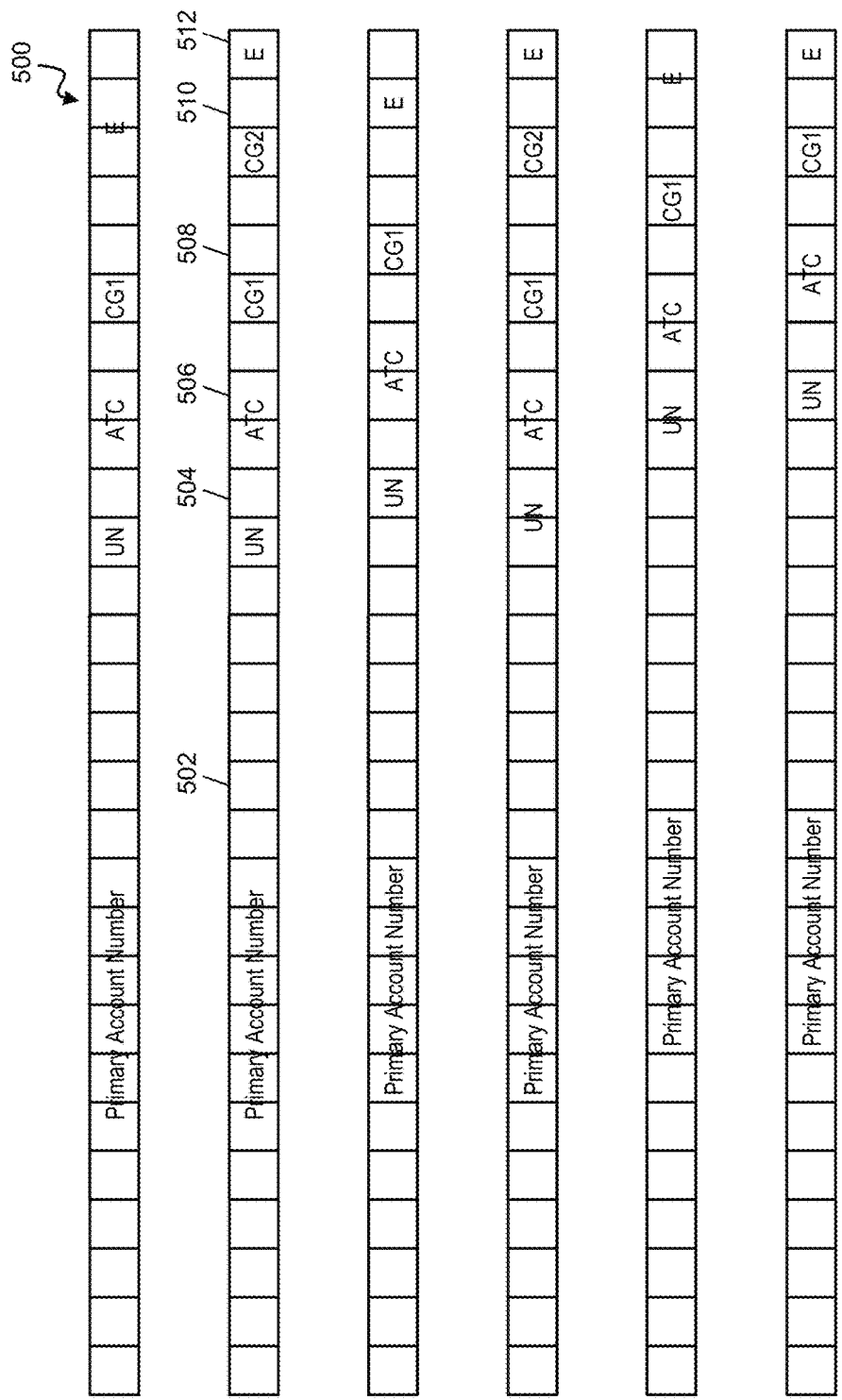
FIG. 5 is a diagram illustrating the varied formatting of a data string for the conveyance of cryptograms and other transaction data for account numbers of varying lengths in accordance with exemplary embodiments.

FIG. 5 illustrates a plurality of different data strings 500, where each data string 500 may be formatted based on a specified formatting template according to varying transaction account number and unpredictable number lengths and number of included cryptograms.

As illustrated in FIG. 5, each data string 500 may include a primary account number (PAN) 502, which may be a transaction account number corresponding to a transaction account that has been selected for use in payment of a payment transaction. The PAN 502 may comprise at least sixteen digits, and, in some instances, may be greater than 16 digits, such as in four of the six data strings 500 illustrated in FIG. 5. Each data string 500 may also include an unpredictable number (UN) 504. The unpredictable number may be of a varying length, such as two or three digits as illustrated in FIG. 5.

Each data string 500 may also include a transaction counter (ATC) 506, which may be a number associated with the transaction account used in funding the payment transaction that indicates a number of transactions that have been initiated using the associated transaction account. The ATC 506 may be updated by the computing device 102 to match an ATC kept by the payment network 112 or issuer 106 for use in generating corresponding cryptograms for use in validation and authorization of the payment transaction. While each ATC 506 illustrated in FIG. 5 is two digits, it will be apparent to persons having skill in the relevant art that the ATC 506 may be comprised of additional digits.

Each data string 500 may also include a first cryptogram (CG1) 508. The first cryptogram 508 may be a cryptogram generated via application of one or more algorithms to at least the UN 504 and ATC 506 included in the respective data string 500. In some instances, a data string 500 may also include a second cryptogram (CG2) 510. The second cryptogram 510 may be generated using the same data, but via application of one or more different algorithms to the data. While each cryptogram 508 and 510 is illustrated in FIG. 5 as comprising three digits, it will be apparent to persons having skill in the relevant art that the length of each cryptogram may be different from one another and may differ from the length illustrated in FIG. 5 and discussed herein.

In some instances, a data string 500 may also include one or more extra digits (E) 512. Each extra digit may be configured to store additional data suitable for use in the processing of payment transactions, such as cardholder verification method data. In some instances, a data string 500 may not include any extra digits depending on the other data and lengths thereof included in the data string 500.

It will be apparent to persons having skill in the relevant art that the data included in each data string 500 may be included in a different position than illustrated in FIG. 5, and each data string 500 may include additional data. For example, a data string configured to store Level 1 data may include additional data and may be formatted differently than a data string configured to store Level 2 data for use in a transaction. In such instances, the data illustrated in FIG. 5 in each data string may be included in a different order and may be spaced out from the other elements illustrated therein, such as to account for additional data suitable for use in traditional transaction processing.

Figure 6:
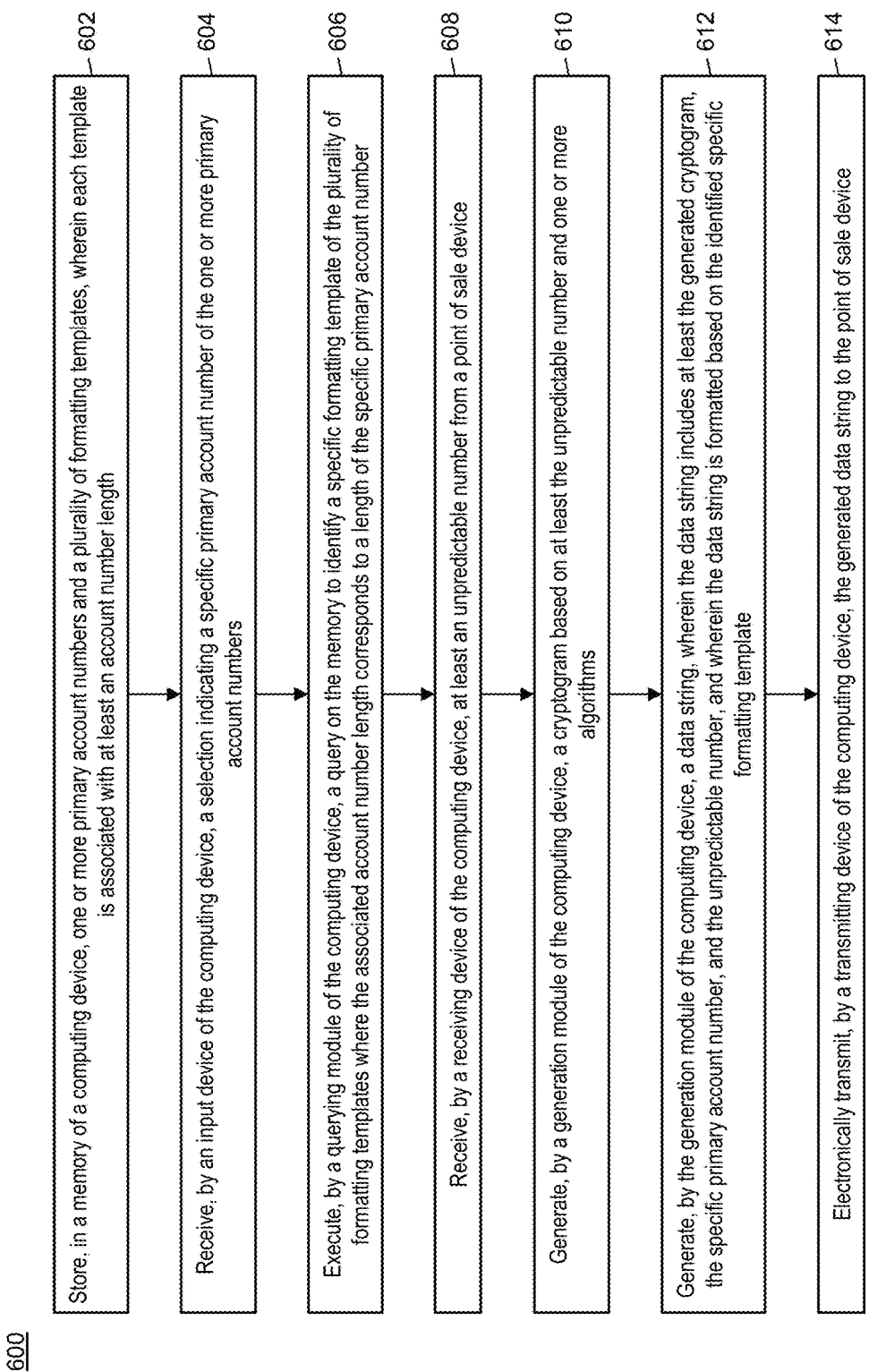
FIG. 6 is a flow chart illustrating an exemplary method for enhanced validation of cryptograms for varying account number lengths in accordance with exemplary embodiments.

Exemplary Method for Enhanced Validation of Cryptograms for Varying Account Number Lengths FIG. 6 illustrates a method 600 for the enhanced validation of cryptograms for payment transactions that account for variance in transaction account number and unpredictable number lengths.

In step 602, one or more primary account numbers and a plurality of formatting templates may be stored in a memory (e.g., the memory 216) of a computing device (e.g., the computing device 102), wherein each template is associated with at least an account number length. In step 604, a selection indicating a specific primary account number of the one or more primary account numbers may be received by an input device (e.g., the input module 210) of the computing device.

In step 606, a query may be executed by a querying module (e.g., the querying module 206) of the computing device on the memory to identify a specific formatting template of the plurality of formatting templates where the associated account number length corresponds to a length of the specific primary account number. In step 608, at least an unpredictable number may be received by a receiving device (e.g., the receiving device 202) of the computing device from a point of sale device (e.g., point of sale device 108).

In step 610, a cryptogram may be generated by a generation module (e.g., the generation module 208) of the computing device based on at least the unpredictable number and one or more algorithms. In step 612, the generation module of the computing device may generate a data string, wherein the data string includes at least the generated cryptogram, the specific primary account number, and the unpredictable number, and wherein the data string is formatted based on the identified specific formatting template. In step 614, the generated data string may be electronically transmitted by a transmitting device (e.g., the transmitting device 214) of the computing device to the point of sale device.

In one embodiment, each formatting template of the plurality of formatting templates may be further associated with a number of digits, and the specific formatting template may be identified based on a correspondence between the associated number of digits and a number of digits of the received unpredictable number. In some embodiments, the method 600 may further include generating, by the generation module of the computing device, a second cryptogram based on at least the unpredictable number and at least one additional algorithm, wherein the data string further includes the second cryptogram.

In one embodiment, the generated data string may be electronically transmitted in a data message that further includes a bitmap indicative of formatting of the generated data message. In a further embodiment, the method 600 may also include generating, by the generation module of the computing device, the bitmap based on at least the identified specific formatting template. In another further embodiment, each formatting template of the plurality of formatting templates may further include a bitmap, and the bitmap included in the data message may correspond to the bitmap included in the identified specific formatting template.

In some embodiments, the memory may further include, for each of the one or more primary account numbers, a transaction counter, and the generated data string may further include the transaction counter associated with the specific primary account number. In a further embodiment, the cryptogram may be further based on the transaction counter associated with the specific primary account number. In one embodiment, the data string may further include at least one extra digit, and where a number of extra digits is based on the length of the specific primary account number and a number of digits of the received unpredictable number. In a further embodiment, the at least one extra digit may store cardholder verification method data.

Payment Transaction Processing System and Process

Figure 7:
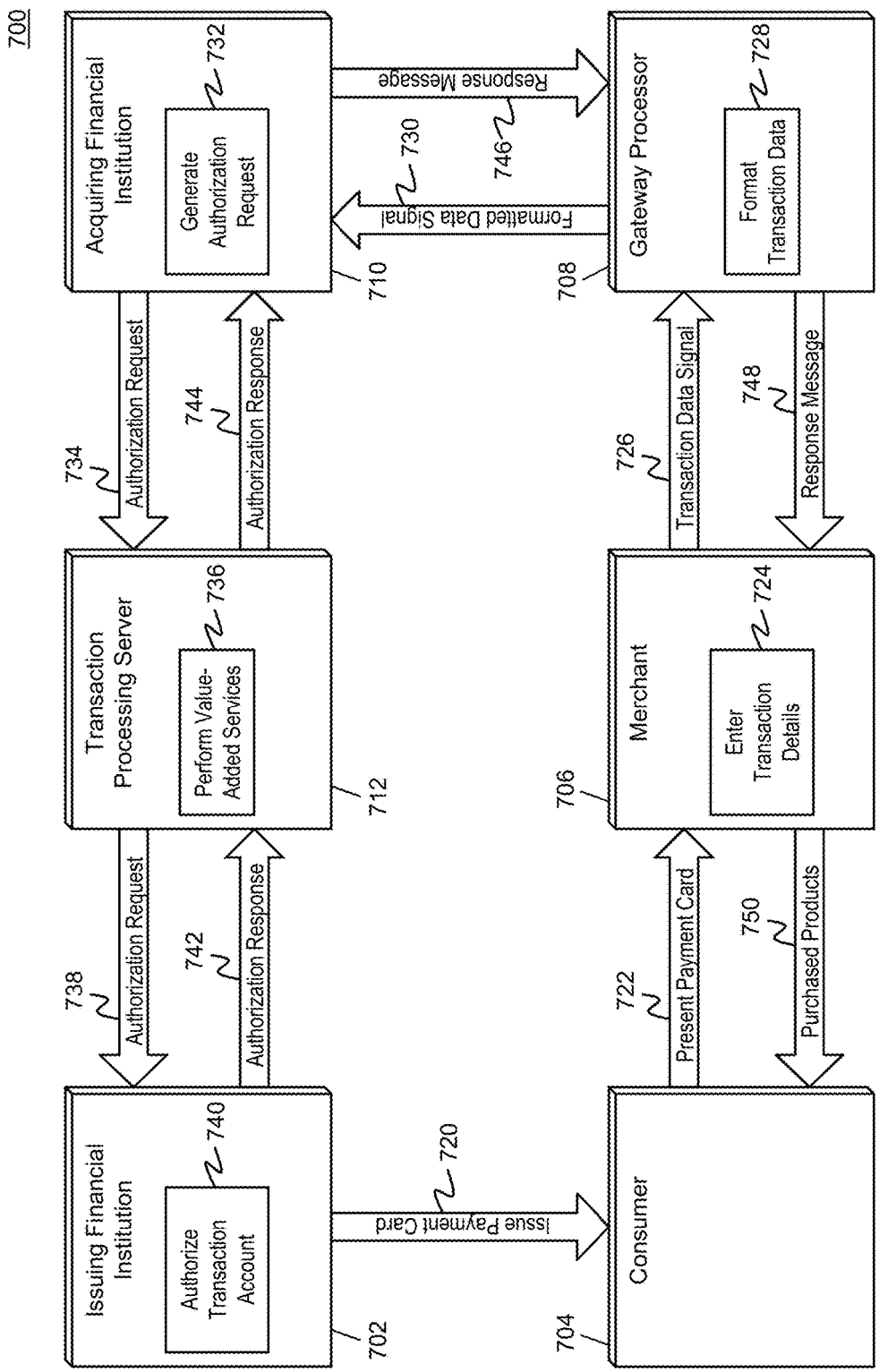
FIG. 7 is a flow diagram illustrating the processing of a payment transaction in accordance with exemplary embodiments.

FIG. 7 illustrates a transaction processing system and a process 700 for the processing of payment transactions in the system. The process 700 and steps included therein may be performed by one or more components of the system 100 discussed above, such as the computing device 102, consumer 104, issuer 106, point of sale device 108, acquirer 110, payment network 112, etc. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3, 4, and 6, discussed above, with respect to the step or steps involved in the processing of a payment transaction. In addition, the entities discussed herein for performing the process 700 may include one or more computing devices or systems configured to perform the functions discussed below. For instance, the merchant 706 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 708 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 702 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 750, assuming the transaction was approved, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 702. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution 702. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing.

The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
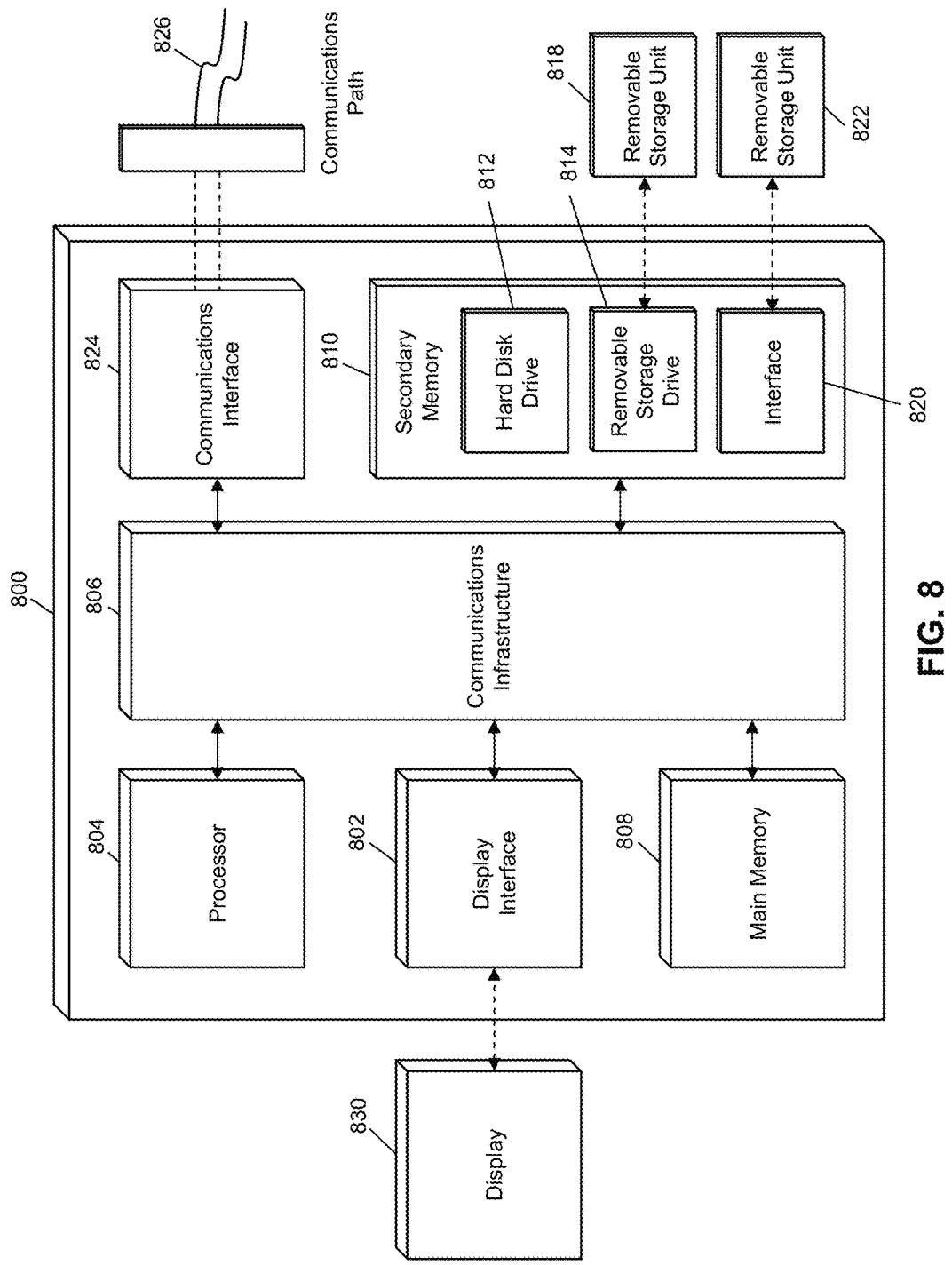
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the computing device 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4, 6, and 7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3, 4, 6, and 7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for enhanced validation of cryptograms for varying account number lengths. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for enhanced validation of cryptograms, comprising:

generating, by a generation module of a computing device, a cryptogram based on an unpredictable number;

executing, by a querying module of the computing device, a query on a memory of the computing device, to identify a specific formatting template from a plurality of stored formatting templates, wherein (i) the specific formatting template is associated with an account number length, and (ii) the associated account number length corresponds to a length of a specific account number;

generating, by the generation module of the computing device, a data string, wherein the data string includes at least the generated cryptogram, the specific account number, and the unpredictable number, and wherein the data string is formatted based on the identified specific formatting template; and electronically transmitting, by a transmitting device of the computing device, the generated data string to a point of sale device.

2. The method of claim 1, further comprising:
receiving, prior to the generation of the cryptogram, the unpredictable number from the point of sale device.

3. The method of claim 1, further comprising:
prior to the generation of the cryptogram, transmitting, by the computing device, to the point of sale, a request for the unpredictable number, wherein the request specifies a particular number of digits for the unpredictable number.

4. The method of claim 1, wherein the specific formatting template is identified based on a correspondence between number of digits associated with the specific formatting template and a number of digits of the unpredictable number.

5. The method of claim 1,
wherein the generated data string is electronically transmitted to the point of sale in a data message that further includes a bitmap indicative of formatting of the generated data message, and
wherein the bitmap included in the data message corresponds to a bitmap included in the specific formatting template.

6. The method of claim 1, further comprising:
generating, by the generation module of the computing device, a bitmap based on at least the specific formatting template for inclusion in a data message to the point of sale.

7. The method of claim 1, wherein the generated data string further includes a transaction counter associated with the specific account number.

8. The method of claim 7, wherein the cryptogram is further based on the transaction counter associated with the specific account number.

9. The method of claim 1, further comprising:
generating, by the generation module of the computing device, a second cryptogram based on at least the unpredictable number, wherein
the data string further includes the second cryptogram.

10. The method of claim 1, wherein
the data string further includes at least one extra digit storing cardholder verification method data, and
a number of extra digits is based on the length of the specific account number and a number of digits of the unpredictable number.

11. A system for enhanced validation of cryptograms, comprising:
a transmitter, of a communications interface of a computing device;

a generation module, of a processor device of the computing device, configured to generate a cryptogram based on an unpredictable number; and a querying module, of the processor device of the computing device, configured to execute a query on a memory of the computing device, to identify a specific formatting template from a plurality of stored formatting templates, wherein (i) the specific formatting template is associated with an account number length, and (ii) the associated account number length corresponds to a length of a specific account number, wherein the generation module is further configured to generate a data string (i) including at least the generated cryptogram, the specific account number, and the unpredictable number, and (ii) being formatted based on the identified specific formatting template, and wherein the transmitter is configured to electronically transmit the generated data string to a point of sale device.

12. The system of claim 11, further comprising:
a receiver, of the communication interface of the computing device, configured to receive the unpredictable number from the point of sale device prior to the generation of the cryptogram.

13. The system of claim 11, wherein prior to the generation of the cryptogram, the transmitter is configured to transmit a request for the unpredictable number, the request specifying a particular number of digits for the unpredictable number.

14. The system of claim 11, wherein the specific formatting template is identified based on a correspondence between a number of digits associated with the specific formatting template and a number of digits of the unpredictable number.

15. The system of claim 11,
wherein the generated data string is electronically transmitted, to the point of sale, in a data message that further includes a bitmap indicative of formatting of the generated data message, and
wherein the bitmap included in the data message corresponds to a bitmap included in the specific formatting template.

16. The system of claim 11, wherein
the generation module of the computing device is further configured to generate a bitmap based on at least the specific formatting template for inclusion in a data message to the point of sale.

17. The system of claim 11, wherein the generated data string further includes a transaction counter associated with the specific account number.

18. The system of claim 17, wherein the cryptogram is further based on the transaction counter associated with the specific account number.

19. The system of claim 11, wherein
the generation module of the computing device is further configured to generate a second cryptogram based on at least the unpredictable number, and
the data string further includes the second cryptogram.

20. The system of claim 11, wherein
the data string further includes at least one extra digit storing cardholder verification method data, and
a number of extra digits is based on the length of the specific account number and a number of digits of the unpredictable number.

* * * * *